(12) United States Patent
Skagestad et al.

(10) Patent No.: US 7,598,316 B2
(45) Date of Patent: Oct. 6, 2009

(54) PREPARATION OF POLYMER PARTICLES

(75) Inventors: Vidar Skagestad, Haslum (NO); Lars Kilaas, Trondheim (NO)

(73) Assignee: QIAGEN GmbH, Hilden (DE)

( * ) Notice: Subject to any disclaimer, the term of this patent is extended or adjusted under 35 U.S.C. 154(b) by 617 days.

(21) Appl. No.: 10/482,358

(22) PCT Filed: Jul. 4, 2002

(86) PCT No.: PCT/IB02/02618

§ 371 (c)(1),
(2), (4) Date: Jul. 22, 2004

(87) PCT Pub. No.: WO03/004150

PCT Pub. Date: Jan. 16, 2003

(65) Prior Publication Data

US 2004/0241426 A1 Dec. 2, 2004

(30) Foreign Application Priority Data

Jul. 4, 2001 (GB) .................................. 0116359.1

(51) Int. Cl.
*C08K 3/22* (2006.01)
(52) U.S. Cl. ...................... 524/785; 524/781; 524/783; 252/62.54; 252/62.56
(58) Field of Classification Search ................ 524/785, 524/783, 781; 252/62.54, 62.56
See application file for complete search history.

(56) References Cited

U.S. PATENT DOCUMENTS

| 4,935,456 | A | * | 6/1990 | Huang et al. ................. 523/207 |
| 5,128,204 | A | * | 7/1992 | Charmot ..................... 428/329 |
| 5,352,481 | A | | 10/1994 | Bak et al. |
| 5,662,824 | A | * | 9/1997 | Sang et al. ............... 252/62.56 |
| 5,945,525 | A | * | 8/1999 | Uematsu et al. .......... 536/25.42 |
| 2001/0014468 | A1 | * | 8/2001 | Muller-Schulte ............ 435/181 |
| 2004/0265233 | A1 | * | 12/2004 | Holzer et al. .............. 424/9.32 |

FOREIGN PATENT DOCUMENTS

| JP | 63-172814 | | 7/1988 |
| JP | 02-415284 | | 12/1990 |
| JP | 11-115622 | | 4/1999 |
| WO | 99/19000 | * | 4/1999 |

* cited by examiner

*Primary Examiner*—Margaret G Moore
(74) *Attorney, Agent, or Firm*—Leon R. Yankwich; David G. O'Brien; Yankwich & Associates, P.C.

(57) ABSTRACT

A process for the preparation of polymer magnetic particles, which comprises: providing a water phase containing magnetic components homogeneously dispersed therein, wherein the water phase is contacted with or further contains a polymerisable metal-containing or organic monomer which is soluble in the water phase, and polymerizing the monomer in the presence of the magnetic components so as to form polymer magnetic particles in which the magnetic components are substantially uniformly distributed; wherein at least a part of the polymerizing step is carried out in a water-in-oil emulsion in which the water phase containing the magnetic components homogenously dispersed therein is present as a discontinuous phase in a continuous oil phase.

20 Claims, No Drawings

PREPARATION OF POLYMER PARTICLES

CROSS REFERENCE TO RELATED APPLICATIONS

This application is a United States national filing under 35 U.S.C. §371 of international (PCT) application No. PCT/IB02/02618, filed Jul. 4, 2002, designating the US, and claiming priority to Great Britain Application No. 0116359.1, filed Jul. 4, 2001.

The invention relates to a process for the preparation of polymer magnetic particles and particles obtainable therefrom, particularly for use as separation media, especially for separating a target substance from a sample such as a biological sample.

BACKGROUND TO THE INVENTION

Various types of separation media are available for use in isolating target substances in chemical or biological samples. In molecular biology, various materials are used in fractionation procedures, including agarose and polyacrylamide in electrophoretic fractionation, and gel permeation, ion exchange and affinity materials for chromatography. Among such materials, both organic polymer and silicon-based particles find use in separations of targets such as nucleic acids. In each type of separation there is a need at some point physically to remove a liquid phase from the particles in the solid phase. This may be achieved by immobilising the particles, for example in the form of a column or on a gel plate, and eluting the liquid phase or by aggregating the particles by applying a force under centrifugation or using magnetism. The use of magnetism to separate particles from other sample components requires the particles to respond to a magnetic field. Because organic or silicon-based materials are not themselves magnetically responsive, there is a need to devise methods of production of magnetic particles which incorporate both a magnetic component and a polymer component.

U.S. Pat. No. 5,945,525 describes a method for isolating nucleic acid using silica-coated magnetic particles. Coated particles are formed by deposition of silica from a tetraethoxy silane/alcohol solution onto the surface of triiron tetroxide particles of diameter 200 to 400 nm. Magnetic particles comprising a magnetic core surrounded by silica are formed by a reaction between the coated particles and sodium silicate. U.S. Pat. No. 5,352,481 describes a process for forming particles having a uniform size distribution by the so-called sol-gel method. Titania powdered core particles are coated with a silica gel by allowing an alcoholic solution of silicon tetraethoxide to be hydrolysed so that a silica sol-gel is formed as a coating.

A problem with these methods when used to produce polymer magnetic particles is that they are multi-step methods in which the amount of magnetic component and its distribution in the particles is very difficult to control. Generally, such particles have a non-uniform distribution of magnetic component because the magnetic component is situated only at the core of the particle. This affects adversely performance of the particles in separation procedures.

SUMMARY OF THE INVENTION

The present invention aims to overcome the disadvantages of the prior art. Accordingly, in a first aspect, the present invention provides a process for the preparation of polymer magnetic particles, which comprises:

(a) providing a water phase containing magnetic components homogeneously dispersed therein;
(b) wherein the water phase is contacted with or further contains a polymerisable metal-containing or organic monomer which is soluble in the water phase; and
(c) polymerising the monomer in the presence of the magnetic components so as to form polymer magnetic particles in which the magnetic components are substantially uniformly distributed;

wherein at least a part of the polymerising step (c) is carried out in a water-in-oil emulsion in which the water phase containing the magnetic components homogeneously dispersed therein is present as a discontinuous phase in a continuous oil phase.

It has surprisingly been found that if at least a part of the formation of the polymer matrix of the polymer magnetic particles takes place in a water-in-oil emulsion, control over the distribution of the magnetic components in the particles can be achieved. A substantially uniform distribution of magnetic component within the particle is found to arise where the magnetic component is sufficiently homogeneously dispersed in the water phase during polymerisation.

It is possible to begin polymerisation in the water phase and subsequently add an oil phase to establish the emulsion during polymerisation. However, it is preferred that the water phase is provided as part of the water-in-oil emulsion so that the monomer may be contacted with the emulsion directly and at the start of the polymerisation process. In addition, by changing the amount of monomer added, the capacity of the forming polymer particle to swell can be fine tuned and controlled. Water acts as a porogen and so by increasing the amount of water, the porosity of the polymer particle can be increased.

In one aspect, the monomer is contacted with the water phase in situ. This may be achieved by using a precursor compound which is converted to the monomer in situ. Advantageously, the emulsion is mixed with an oil-soluble silicon-containing or organic precursor compound under conditions to convert the precursor compound into the monomer. Preferably, the precursor compound is converted into a monomer by hydrolysis. According to this embodiment, the precursor compound includes functional groups or substituents which are hydrolysable to form the monomer. The precursor compound may comprise a metal alkoxide in which the metal is preferably selected from silicon, bismuth, boron, titanium, tantalum, zirconium or aluminium. Silicon is the preferred metal. The alkoxide may be a di, tri or tetra alkoxy compound, preferably a siloxane. Typical alkoxides are $C_1$ to $C_5$ alkoxides of which methoxide and ethoxide are preferred, especially methoxide.

Where the precursor compound is converted into the monomer by hydrolysis, a pH in the range 1 to 14 may be used, typically 1.5 to 12, preferably 1.5 to 11. It is preferred that the water phase is acidic or alkaline, so as to facilitate hydrolysis. Suitable pHs are in the range 1 to 5 and 8 to 14. An acidic pH is preferred, especially in the range 1 to 2. It is also possible to include in the water phase a catalyst for facilitating hydrolysis, such as an organic or inorganic acid or amine. A reagent for promoting condensation or polymerisation may also be included.

Without wishing to be bound by theory it is thought possible that conversion of the precursor compound into the monomer takes place either within the water phase or at the interface between the water phase and the continuous oil phase. It is thought that this in situ production of reactive monomer enables polymer formation to occur in intimate mixture with the magnetic component so as to facilitate uniform distribution of the magnetic component in the polymer particle thus formed.

The distribution of the magnetic component in the polymer particles may be assessed by any method known to those of ordinary skill in this technical field.

In a further aspect the water phase is provided with a polymerisable metal-containing or organic monomer dissolved therein and contains magnetic components homogeneously dispersed therein. The water phase may be provided by firstly dissolving the monomer and then adding the magnetic component or by first adding the magnetic component and then dissolving the monomer. At a suitable point, usually after formation of the water phase, an oil phase and optionally a stabiliser such as a detergent is mixed together to form a water-in-oil emulsion. The monomer is then polymerised in the presence of the magnetic components, typically by adjusting the conditions to initiate polymerisation. Polymerisation may be initiated by adding components such as acidic or basic components or a catalyst through the continuous phase.

The water phase of the emulsion preferably comprises water droplets. The size of the water droplets may be readily controlled during emulsion formation, for example by the speed and vigour of mixing of the oil phase with the water phase, viscosity of the continuous/discontinuous phase, type and amount of stabilizer and temperature. Mixing of water droplets with the oil phase may be effected by any suitable technique, including homogenization, ultrasonication and use of high speed mixers. By controlling the size of the water droplets using the mixing conditions, it is possible to control the size of the polymer magnetic particle product formed by the process. The larger the water droplet size, the larger the particle product. Typically, the particles according to the invention are substantially spherical. They generally have a diameter in the range 0.1 to 100 μm, preferably in the range 0.5 to 50 μm and most preferably in the range 1 to 10 μm.

It is also found that by controlling the size of water droplets in this manner, a relatively narrow particle size distribution may be obtained. Preferably, particle size distributions with a CD less than 30% are obtained, as measured by light scattering using, for example, Coulter counter (LS 230).

Control of particle size and narrowness of particle size distribution are important aspects of the present invention. It is difficult to achieve a narrow particle size distribution using prior art methods. Moreover, silica particles made in the prior art from magnetite grains cannot be smaller than the size of the original grains.

The magnetic component of the present invention is a material capable of being magnetised in the presence of a magnetic field but which is not itself magnetic in the absence of such a field at the operational temperature of the polymer magnetic particles. The magnetic components should therefore possess no residual magnetization or remanence after exposure to the magnetic field. Such materials include paramagnetic and superparamagnetic materials. They also include ferromagnetic and ferrimagnetic materials, provided that they have a sufficiently low Curie temperature that, in operation, the polymer magnetic particles are not magnetic in the absence of an applied magnetic field. Typical materials include magnetic metal oxides, preferably an iron oxide such as triiron tetraoxide or iron sesquioxide. Useful magnetic metal oxides include iron oxides in which, optionally, all or a part of the ferrous iron thereof is substituted by a divalent transition metal such as cadmium, chromium, cobalt, copper, magnesium, manganese, nickel, vanadium, and/or zinc.

Whichever magnetic component is used, it must be dispersed in the water phase.

Homogeneous dispersion may be assessed visually by light microscopy or by UV absorption spectroscopy on small samples to quantify variation in magnetic component content. Homogeneous dispersion is best achieved with magnetic components whose size is small in comparison with typical droplet size for water. An advantageous size range for the magnetic component is no more than 100 nm, preferably no more than 50 nm, more preferably no more than 25 nm and most preferably in the range 1 to 15 nm. Magnetic component particles of size 200 nm or greater are generally so big that they cannot be homogeneously dispersed in the water phase of the water-in-oil emulsions typically used in the present invention. Larger ferromagnetic particles can also have remanence.

It is preferred that the magnetic component is supplied as a magnetic fluid, most preferably a ferrofluid. Ferrofluids typically have an average particle size of about 8.5 nm.

Macroscopically, considering all the water droplets of the emulsion of the invention, these are very small and may be fine tuned by speed mixing to be in the range of 0.1 to 100 μm, preferably 0.1 to 10 μm. These small sized water droplets with small magnetic particles (such as ferro fluids) in the range 1 to 15 nm, will always end up having a homogenous and controlled concentration of magnetic particles in substantially all of the water droplets of the entire emulsion. By contrast, with 200-400 nm sized magnetic particles in the same water-in-oil emulsion, there will be no control over the total number of magnetic particles in each of the water droplets of the emulsion since the size of the magnetic particles is large compared to the water droplet. Macroscopically, there will be a non homogeneous distribution of the magnetic particles since each of these water droplets will not contain reveal a uniform concentration of magnetic particles.

In the case of a 1.0 μm water droplet, according to the present invention the size of the magnetic particles in that droplet is small compared to the droplet volume allowing a statistically uniform concentration of magnetic particle in all droplets of the same size. According to the prior art of U.S. Pat. No. 5,945,525, the size of the magnetic particle is actually more than ⅕ of that droplet size. For this case, in some particles you will find × magnetic particles in some droplets you will find 2× magnetic particles and in some droplets you will find no magnetic particles; there will therefore not be a statistically uniform concentration ratio of magnetic particles in all the water droplets.

A small sized magnetic particle (ferro fluid) is therefore advantageous for controlling the magnetic loading (amount of ferro fluid) in the final polymer particles.

Microscopically, focusing on only one water droplet, according to the present invention the magnetic particles (e.g. 10 nm) will be homogeneously dispersed in the water droplet (e.g. 0.5 μm) with a ratio of 1/50 (10 nm magnetic particles/ 0.5 μm water droplet). In contrast, in U.S. Pat. No. 5,945,525 the ratio is about 1/2 (0.2 μm magnetic particles/0.5 μm water droplet). The magnetic particles will thus be much less homogeneously dispersed in the water droplet and the effect will be more pronounced as the water droplets size decreases and indeed impossible for very small sized droplets (0.1 to 0.2 μm). In one relatively large section of the droplet you will have a magnetic particle, and in another section of the same droplet there will be no particles. The final particle will therefore have a non uniform distribution of iron. In contrast, according to the present invention, even small sections of the droplet will contain magnetic particles and the final particle will then have a uniform distribution of iron in the whole particle matrix.

By increasing the concentration of magnetic components in the water phase, the concentration of magnetic component in the polymer particle product can be controlled. This is advantageous in that some applications of these particles may require them to be more strongly responsive to an applied magnetic field than others. In some cases a slow settling time for particles in solution is required. This is readily achievable in accordance with the present invention and represents a further advantage over the prior art where larger metal grain sizes result in heavy particles.

The polymer magnetic particles obtainable by the present process in which the magnetic component is substantially uniformly distributed are thought to be superior to those polymer magnetic particles presently available. Using light microscopy it is found that magnetic polymer particles currently available incorporate magnetite or other metal oxides only in an aggregated non-homogenous form as visible metal cores coated with layers of silica. In contrast, the present invention provides a magnetic component which is homogeneously and uniformly distributed throughout the particle matrix. This has an important advantage over the prior art magnetic particles in providing a uniform and potentially rapid response to a magnetic field when in use. This makes possible aggregation of the particles at a uniform speed onto the surface by application of a magnetic field which is an essential property when using such particles, for example, in an automated separation system.

DETAILED DESCRIPTION OF THE INVENTION

The invention will now be described in further detail, by way of example only, with reference to the following examples.

Examples

1. Particle Formation at Low pH a)
An acidic aqueous ferrofluid (5.0 g, pH 1.4, 177 mg magnetite/g) is mixed with a parafine oil or toluene (50 g) containing 3% (by weight) Span 65. The mixture was emulsified using an ultraturax for 2 min. resulting in an W/O emulsion where the magnetite are homogenous distributed throughout the whole volume of the water droplets. The emulsion is stirred sufficient to prevent settling of magnetic droplets and TMOS (tetramethoxysilan, 9 g) in toluene is gradually added. After continuous stirring at 30° C. for 10 h, a base (0.1 M NaOH or 0.5 M aqueous ammonia) is added. Stirring is continued for another 3 h and the magnetic particles are isolated using a magnetic device. The polymer magnetic particles are subsequently washed with toluene, methanol and water. The particles may be used e.g. for isolating DNA directly or a drying step followed by a re-suspension in water can be included.

b)
While stirring at 0° C., TMOS (9 g) is added to an acidic ferrofluid (4.5 g, pH1.2, 205 mg magnetite/g). The suspension is stirred for another 15 min. at room temperature before a parafine oil or toluene (50 g) containing 3% (by weight) Span 65 is added. The mixture was emulsified using an ultraturax for 3 min. resulting in an W/O emulsion where the magnetite are homogenous distributed throughout the whole volume of the water droplets. Stirring is conducted at a speed sufficient for the water droplets not to settle for 10 h at 30° C., where after a base (0.1 M NaOH or 0.5 M aqueous ammonia) is added. Stirring is continued for another 3 h and the polymer magnetic particles are isolated using a magnetic device. The polymer magnetic particles are subsequently washed with toluene, methanol and water. The polymer magnetic particles may be used e.g. for isolating DNA directly or a drying step followed by a re-suspension in water can be included.

2. Particle Formation at High pH

An aqueous ferrofluid (5.0 g, pH 11, 50 mg magnetite/g) is mixed with a parafine oil or toluene (50 g) containing 3% (by weight) Span 65. The mixture was emulsified using an ultraturax for 2 min. resulting in an W/O emulsion where the magnetite are homogenous distributed throughout the whole volume of the water droplets. The emulsion is stirred sufficient to prevent settling of magnetic droplets and TMOS (tetramethoxysilan, 9 g) in toluene is gradually added. After continuous stirring at 30° C. for 5 h, 1 g of a base (0.1 M NaOH or 0.5 M aqueous ammonia) is added. Stirring is continued for another 1 h and the polymer magnetic particles are isolated using a magnetic device. The polymer magnetic particles are subsequently washed with toluene, methanol and water. The polymer magnetic particles may be used e.g. for isolating DNA directly or a drying step followed by a re-suspension in water can be included.

3. Use of Sodium Silicate as Monomer

A suspension of a aqueous ferrofluid (7.5 g, pH 11) in Sodium silicate (water glass) (7.5 g) is mixed to achieve another ferrofluid. Toluene or a Norpar oil (the continuous phase) containing e.g. 3% stabilizer (Span 65 or Span 80) is added to the ferrofluid and an W/O emulsion is made using ultrasonication or an Ystral (ultraturax). By using a light microscope one clearly verifies that the magnetite are homogenous distributed in the whole volume of the water droplets. The emulsion is stirred for 4 h at 25° C. (150 rpm) where after an emulsion of 1 ml 25% $NH_4OH$ in 10 ml continuous phase is added. After stirring for 5 min. 2 ml of a 20% solution of $H_2O$ in EtOH is added. The emulsion was stirred at 50° C. for 12 h and the polymer magnetic particles were washed several times with MeOH using a magnetic device.

The invention claimed is:

1. A process for the preparation of polymer magnetic particles, which comprises:
   (a) providing a water phase containing magnetic components homogeneously dispersed therein;
   (b) wherein the water phase is contacted with or further contains a polymerisable monomer comprising a metal oxide or hydroxide, or a metal alkoxide precursor compound which is converted to said monomer by hydrolysis, which is soluble in the water phase; and
   wherein if the metal in the metal alkoxide is silicon the metal alkoxide is tetraalkoxysilane;
   (c) polymerising the monomer in the presence of the magnetic components so as to form polymer magnetic particles in which the magnetic components are substantially uniformly distributed;
   wherein at least a part of the polymerising step (c) is carried out in a water-in-oil emulsion in which the water phase containing the magnetic components homogeneously dispersed therein is present as a discontinuous phase in a continuous oil phase, and
   wherein said process results in the magnetic particles being substantially uniformly distributed throughout the entire polymer matrix of said polymer particle.

2. A process according to claim 1, wherein the water phase has a pH in the range 1 to 5 or 8 to 14.

3. A process according to claim 1, wherein the metal oxide or hydroxide is a silicon oxide or hydroxide.

4. A process according to claim 1, wherein the largest dimension of the magnetic components is in the range 1 to 15 nm.

5. A process according to claim 1, wherein the magnetic components comprise a magnetic metal oxide.

6. A process according to claim 5, wherein the magnetic metal oxide is an iron oxide or an iron oxide in which all or a part of the ferrous iron thereof is substituted by a divalent transition metal selected from cadmium, chromium, cobalt, copper, magnesium, manganese, nickel, vanadium, and zinc.

7. A process according to claim 6, wherein the magnetic metal oxide is an iron oxide.

8. A process according to claim 5, wherein the magnetic metal oxide is provided as a magnetic fluid.

9. A process according to claim 8, wherein the magnetic fluid comprises a ferro fluid.

10. A process according to claim 1, wherein the water phase of the emulsion comprises water droplets.

11. A process according to claim 10, wherein the size of the water droplets is controlled by the mixing conditions used to form the emulsion.

12. A process according to claim 11, wherein the size of the water droplets is in the range 0.1 to 100 µm.

13. A process for the preparation of polymer magnetic particles, which comprises:
(a) providing a water phase containing magnetic components homogeneously dispersed therein, wherein the water phase is provided in a water-in-oil emulsion in which said water phase is present as a discontinuous phase in a continuous oil phase;
(b) contacting the emulsion with a polymerisable monomer comprising a metal oxide or hydroxide, or a metal alkoxide precursor compound which is converted to said monomer by hydrolysis, which is soluble in the water phase; and wherein if the metal in the metal alkoxide is silicon the metal alkoxide is tetraalkoxysilane and
(c) polymerising the monomer in the presence of the magnetic components so as to form polymer magnetic particles in which the magnetic components are substantially uniformly distributed;
wherein at least a part of the polymerising step (c) is carried out in the water-in-oil emulsion, and
wherein said process results in the magnetic particles being substantially uniformly distributed throughout the entire polymer matrix of said polymer particle.

14. A process according to claim 13, wherein the monomer is contacted with the water phase by mixing the emulsion with an oil-soluble metal-containing or organic precursor compound under conditions to convert the precursor compound into the monomer.

15. A process according to claim 14, wherein the alkoxide is a methoxide.

16. A process according to claim 13, wherein the water phase has a pH in the range 1 to 5 or 8 to 14.

17. A process for the preparation of polymer magnetic particles, which comprises:
(a) providing a water phase containing magnetic components homogeneously dispersed therein;
(b) wherein the water phase is contacted with or further contains a polymerisable monomer comprising a metal oxide or hydroxide, or a metal alkoxide precursor compound which is converted to said monomer by hydrolysis, which is soluble in the water phase; and wherein if the metal in the metal alkoxide is silicon the metal alkoxide is tetraalkoxysilane;
(c) polymerising the monomer in the presence of the magnetic components so as to form polymer magnetic particles in which the magnetic components are substantially uniformly distributed;
wherein at least a part of the polymerising step (c) is carried out in a water-in-oil emulsion in which the water phase containing the magnetic components homogeneously dispersed therein is present as a discontinuous phase in a continuous oil phase, and wherein the magnetic components comprise a ferro fluid, and
wherein said process results in the magnetic particles being substantially uniformly distributed throughout the entire polymer matrix of said polymer particle.

18. A process for the preparation of polymer magnetic particles, which comprises:
(a) providing a water phase containing magnetic components homogeneously dispersed therein;
(b) wherein the water phase is contacted with or further contains a polymerisable monomer comprising a metal oxide or hydroxide which is soluble in the water phase; and
(c) polymerising the monomer in the presence of the magnetic components so as to form polymer magnetic particles in which the magnetic components are substantially uniformly distributed; and
wherein at least a part of the polymerising step (c) is carried out in a water-in-oil emulsion in which the water phase containing the magnetic components homogeneously dispersed therein is present as a discontinuous phase in a continuous oil phase; and
wherein the largest dimension of the magnetic components is in the range 1 to 15 nm and the water phase of the emulsion comprises water droplets having a size in the range of 0.1 to 100 µm; and
wherein said process results in the magnetic particles being substantially uniformly distributed throughout the entire polymer matrix of said polymer particle.

19. A process for the preparation of polymer magnetic particles, which comprises:
(a) providing a water phase containing magnetic components homogeneously dispersed therein, wherein the water phase is provided in a water-in-oil emulsion in which said water phase is present as a discontinuous phase in a continuous oil phase;
(b) contacting the emulsion with a polymerisable monomer comprising a metal oxide or hydroxide, which is soluble in the water phase; and
(c) polymerising the monomer in the presence of the magnetic components so as to form polymer magnetic particles in which the magnetic components are substantially uniformly distributed; and
wherein at least a part of the polymerising step (c) is carried out in the water-in-oil emulsion; and
wherein the largest dimension of the magnetic components is in the range 1 to 15 nm and the water phase of the emulsion comprises water droplets having a size in the range of 0.1 to 100 µm; and
wherein said process results in the magnetic particles being substantially uniformly distributed throughout the entire polymer matrix of said polymer particle.

20. A process for the preparation of polymer magnetic particles, which comprises:
(a) providing a water phase containing magnetic components homogeneously dispersed therein;

(b) wherein the water phase is contacted with or further contains a polymerisable monomer comprising a metal oxide or hydroxide which is soluble in the water phase; and (c) polymerising the monomer in the presence of the magnetic components so as to form polymer magnetic particles in which the magnetic components are substantially uniformly distributed; and wherein at least a part of the polymerising step (c) is carried out in a water-in-oil emulsion in which the water phase containing the magnetic components homogeneously dispersed therein is present as a discontinuous phase in a continuous oil phase, and wherein the magnetic components comprise a ferro fluid; and wherein the largest dimension of the magnetic components is in the range 1 to 15 nm and the water phase of the emulsion comprises water droplets having a size in the range of 0.1 to 100 μm; and wherein said process results in the magnetic particles being substantially uniformly distributed throughout the entire polymer matrix of said polymer particle.

* * * * *